United States Patent [19]

Tague et al.

[11] 4,384,341
[45] May 17, 1983

[54] DATA PROCESSOR HAVING CARRY APPARATUS SUPPORTING A DECIMAL DIVIDE OPERATION

[75] Inventors: Steven A. Tague, Billerica; Virendra S. Negi, Pepperell, both of Mass.

[73] Assignee: Honeywell Information Systems Inc., Waltham, Mass.

[21] Appl. No.: 219,638

[22] Filed: Dec. 24, 1980

[51] Int. Cl.³ .............................................. G06F 7/52
[52] U.S. Cl. ................................................... 364/763
[58] Field of Search ............................... 364/763, 762

[56] References Cited

U.S. PATENT DOCUMENTS

| | | | |
|---|---|---|---|
| 2,924,383 | 2/1960 | Weiss | 364/763 X |
| 2,932,450 | 4/1960 | Knight et al. | 364/763 |
| 3,239,654 | 3/1966 | Jackson et al. | 364/763 |
| 3,591,786 | 7/1971 | Nelson | 364/763 |
| 3,735,108 | 5/1973 | Bolt et al. | 364/763 |

Primary Examiner—David H. Malzahn
Attorney, Agent, or Firm—George Grayson; Nicholas Prasinos

[57] ABSTRACT

A commercial instruction processor executes a decimal divide instruction by counting the number of subtractions by the divisor resulting in a positive remainder to develop the quotient. Apparatus compares the most significant decimal digit of the divisor with the most significant decimal digit of the remainder after each subtraction pass to predict if the next subtraction pass would result in a negative remainder. If so, a quotient decimal digit is stored in a memory, the divisor is shifted one decimal digit position to the right, and a series of subtraction passes are made to develop the next quotient decimal digit.

3 Claims, 10 Drawing Figures

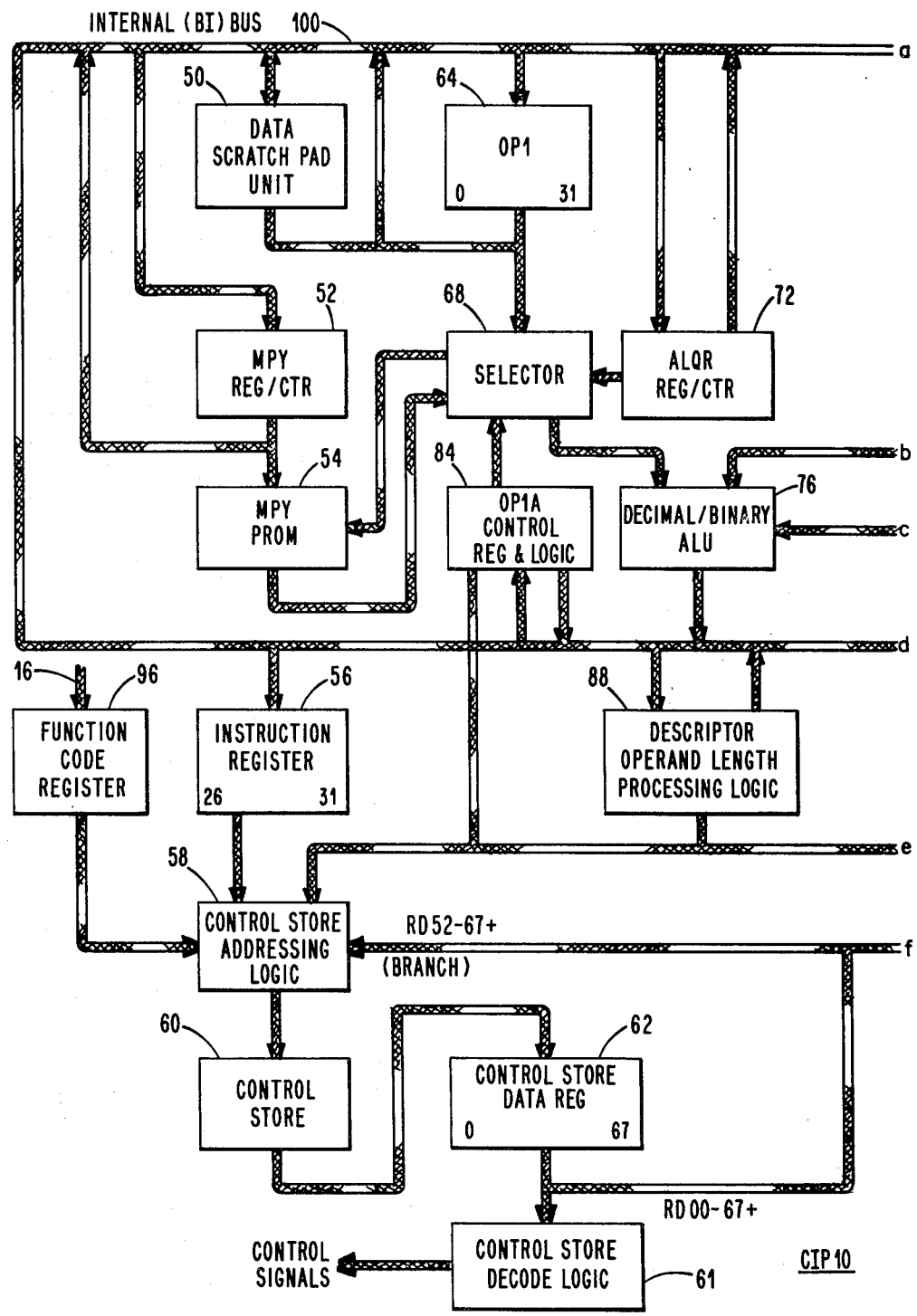
Fig. 2. (sheet 1 of 2)

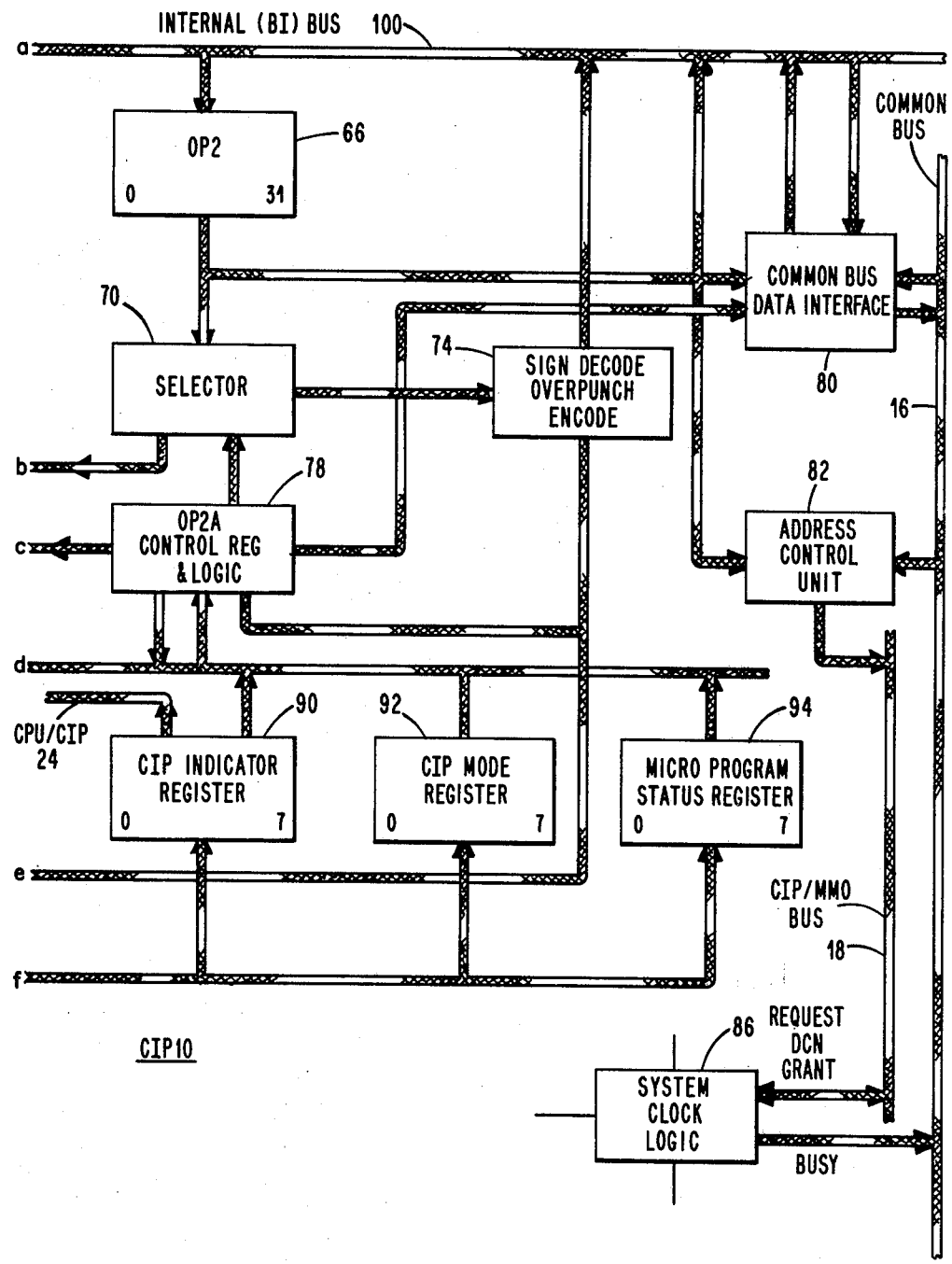
Fig. 2. (sheet 2 of 2)

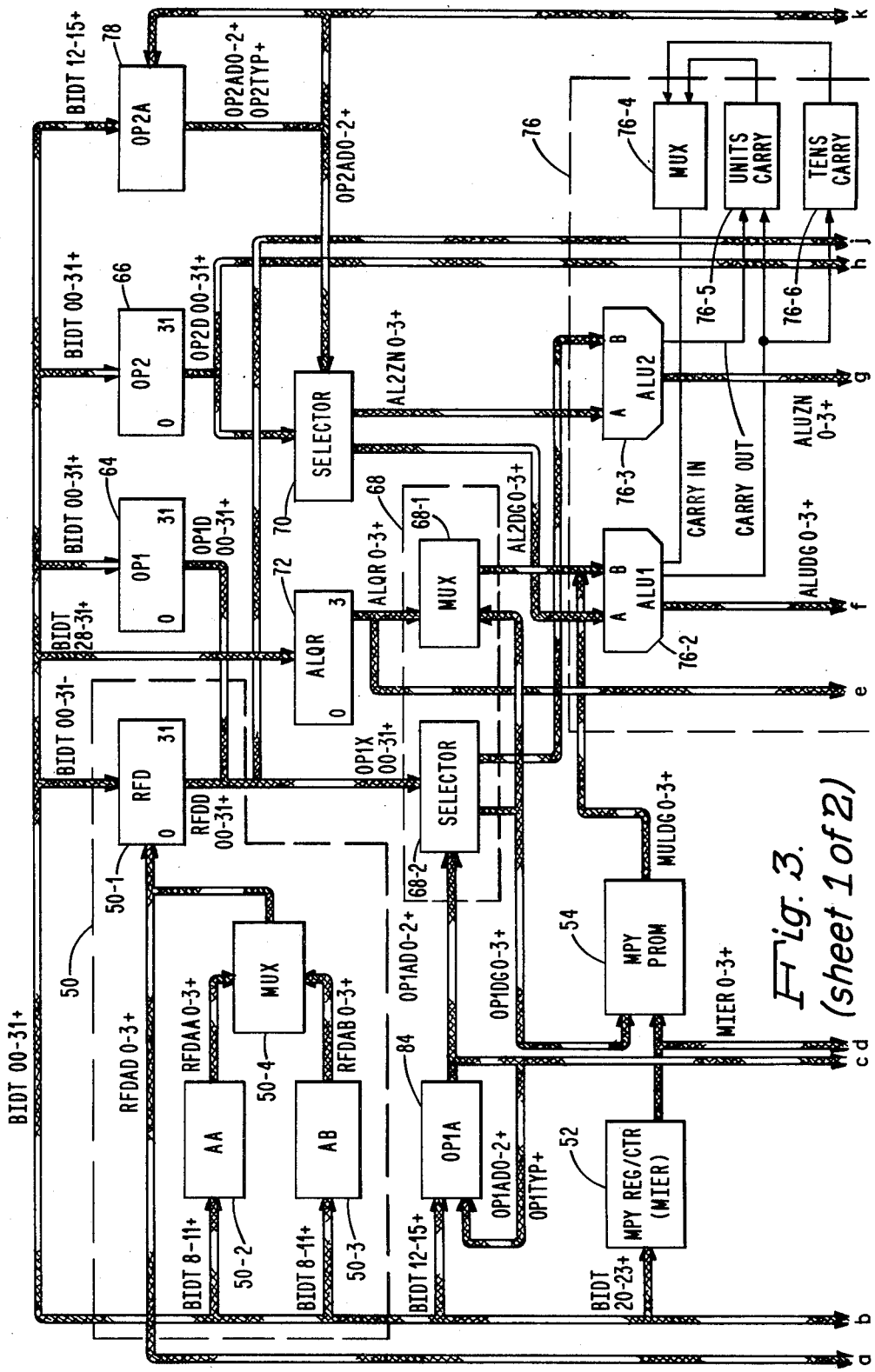
Fig. 3. (sheet 1 of 2)

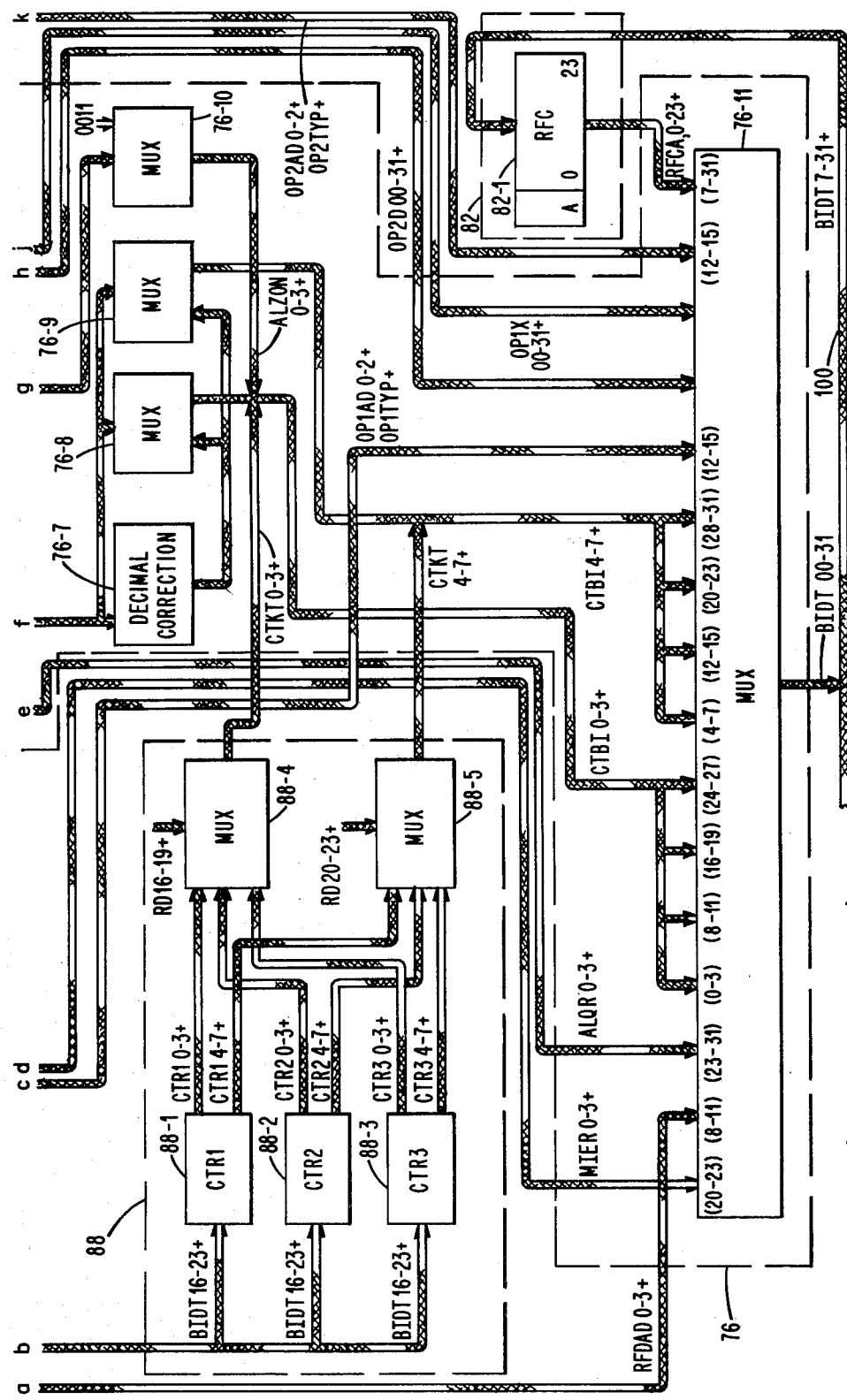
Fig. 3. (sheet 2 of 2)

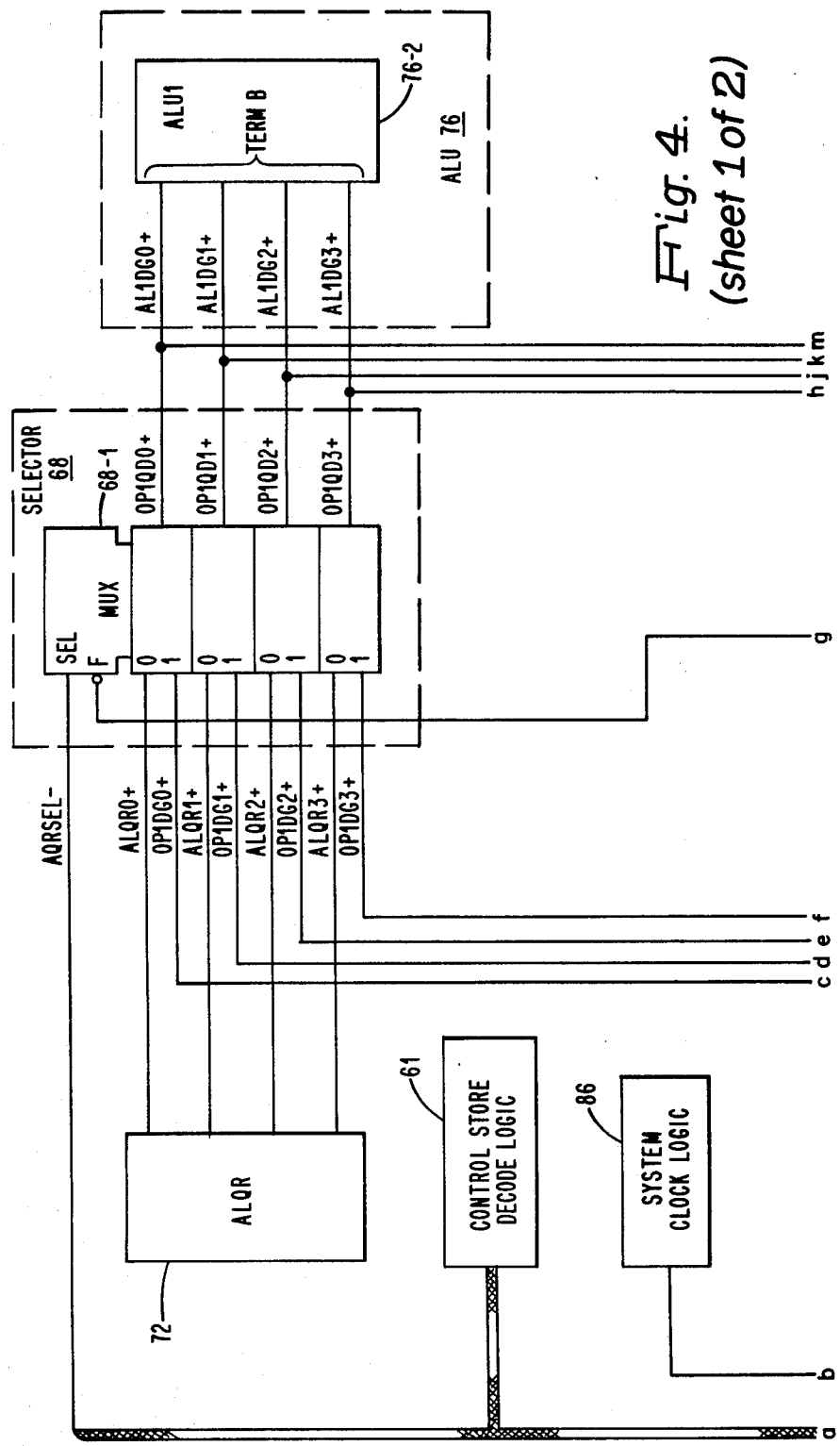
Fig. 4. (sheet 1 of 2)

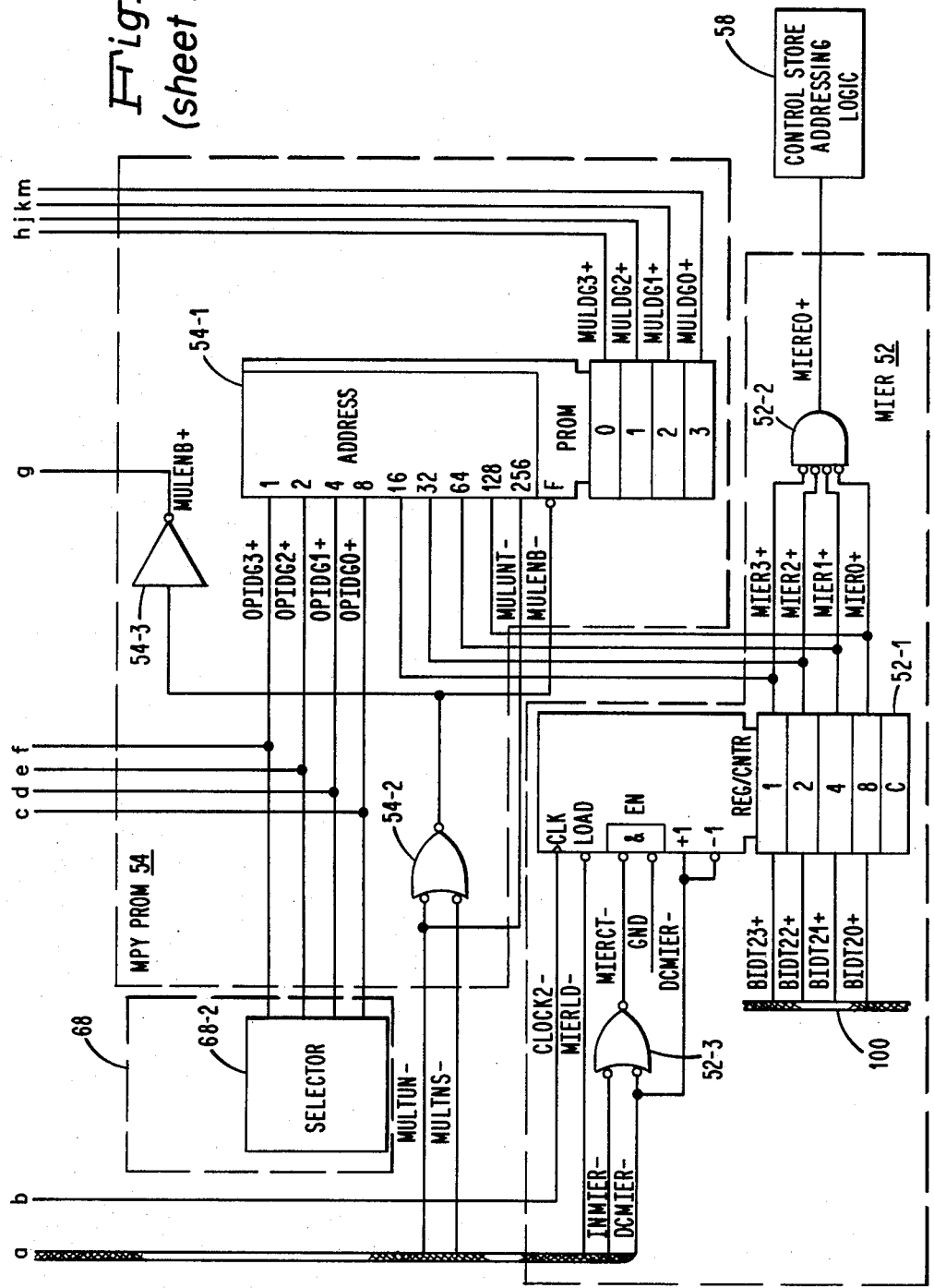
Fig. 4. (sheet 2 of 2)

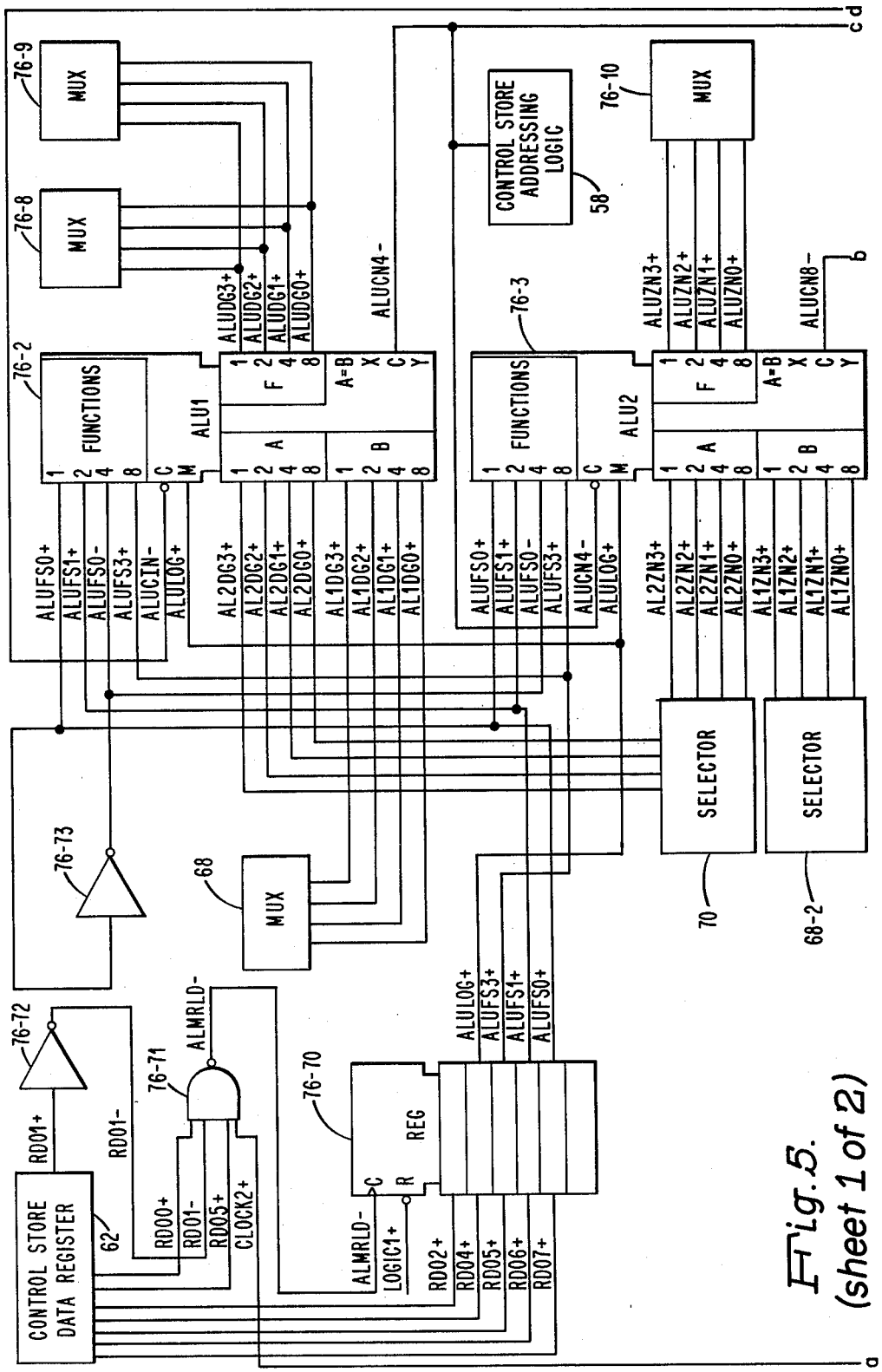
Fig. 5. (sheet 1 of 2)

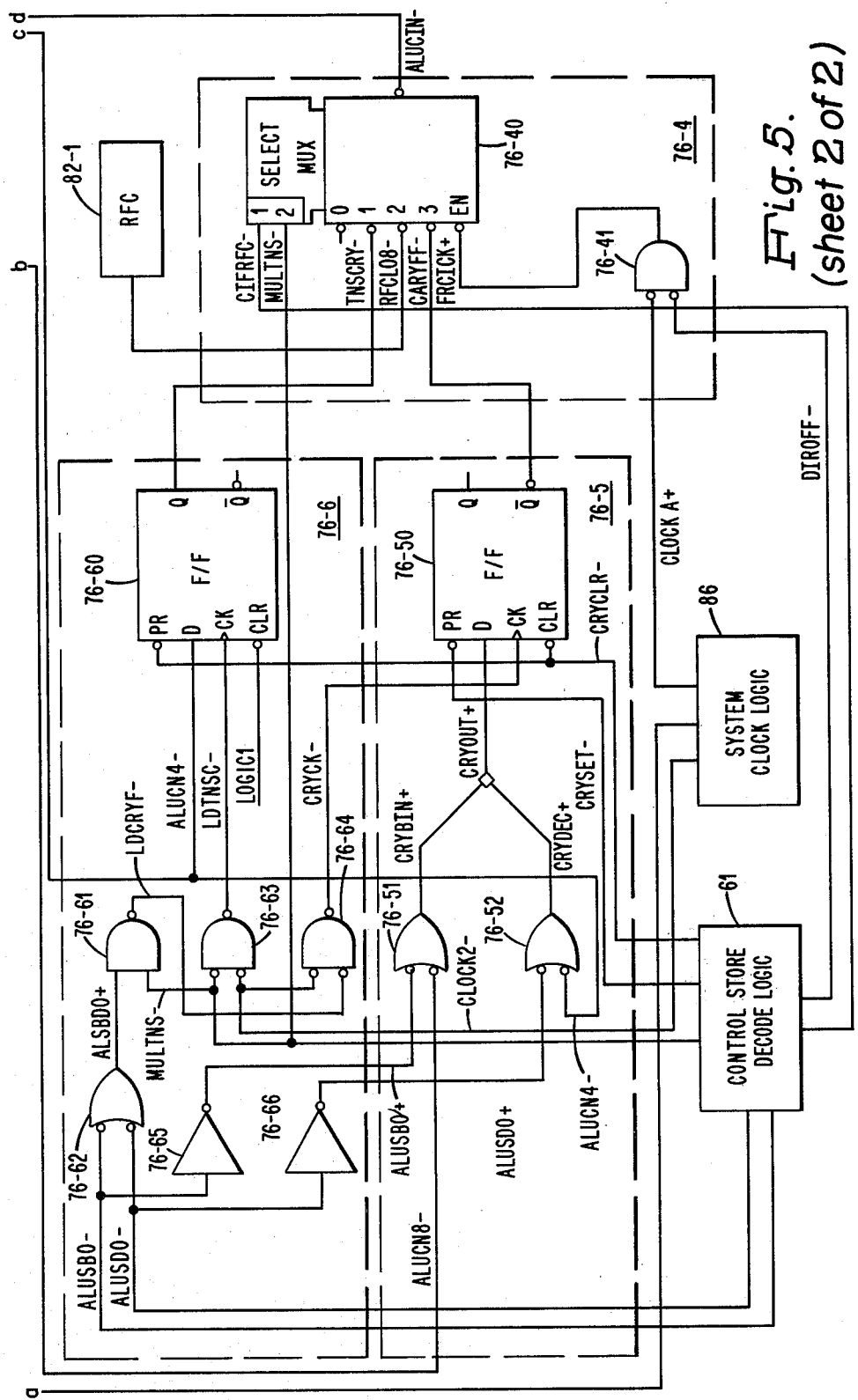
Fig. 5. (sheet 2 of 2)

| STEP | ALQR72 | MIER52 | FRCICK+ | ALUCIN- | CARYFF- | ALUCN4- | OP164 | OP266 | REMARKS |
|---|---|---|---|---|---|---|---|---|---|
| 1 | 0 | 0 | 0 | 0 | 0 | 0 | 5 | 67 | |
| 2 | 0 | 0 | 0 | 0 | 0 | 0 | 5 | 17 | (6-5) |
| 3 | 1 | 0 | 1 | 0 | 0 | 1 | 5 | 17 | COMPARE (1-5) |
| 4 | 1 | 1 | 0 | X | 0 | 0 | 5 | 07 | 5>1 |
| 5 | 0 | 1 | 0 | X | 0 | 0 | 5 | 07 | STORE ALQR72 |
| 6 | 0 | 1 | 0 | 0 | 0 | 0 | 5 | 02 | (7-5) |
| 7 | 1 | 1 | 1 | 0 | 0 | 1 | 5 | 02 | COMPARE (2-5) |
| 8 | 1 | 1 | 0 | 0 | 1 | 1 | 5 | 07 | (2-5) |
| 9 | 2 | 1 | 1 | 0 | 0 | 0 | 5 | 07 | COMPARE (7-5) |
| 10 | 2 | 0 | 0 | X | 0 | 0 | 5 | 07 | 5≤7 |
| 11 | 2 | 0 | 0 | 0 | 0 | 0 | 5 | 02 | (7-5) |
| 12 | 3 | 0 | 1 | 0 | 0 | 1 | 5 | 02 | COMPARE (2-5) |
| 13 | 0 | 0 | 0 | X | 0 | 0 | 5 | 02 | STORE ALQR72 |

*Fig. 6.*

DATA PROCESSOR HAVING CARRY APPARATUS SUPPORTING A DECIMAL DIVIDE OPERATION

RELATED APPLICATIONS

The following U.S. patent applications filed on an even date with the instant application and assigned to the same assignee as the instant application are related to the instant application and are incorporated by reference.

1. "A Data Processor Performing a Decimal Multiply Operation Using a Read Only Memory" by Virendra S. Negi and Steven A. Tague, filed on Dec. 24, 1980 and having U.S. Ser. No. 220,218.
2. "A Data Processor Having Units Carry and Tens Carry Apparatus Supporting a Decimal Multiply Operation" by Virendra S. Negi and Steven A. Tague, filed on Dec. 24, 1980 and having U.S. Ser. No. 219,810.
3. "A Data Processor Using Read Only Memories for Optimizing Main Memory Access and Identifying the Starting Position of an Operand" by Steven A. Tague and Virendra S. Negi, filed on Dec. 24, 1980 and having U.S. Ser. No. 219,809.
4. "A Data Processor Having Apparatus for Controlling the Selection of Decimal Digits of an Operand When Executing Decimal Arithmetic Instructions" by Steven A. Tague and Virendra S. Negi, filed on Dec. 24, 1980 and having U.S. Ser. No. 220,220.
5. "A Data Processor Using a Read Only Memory for Selecting a Part of a Register Into Which Data Is Written" by Steven A. Tague and Virendra S. Negi, filed on Dec. 24, 1980 and having U.S. Ser. No. 220,219.

BACKGROUND OF THE INVENTION

1. Field of the Invention

This invention relates generally to the execution of decimal arithmetic instructions by a commerical instruction processor of a data processing system, and more specifically to apparatus which, during the execution of a decimal divide instruction by the successive subtraction method, tests the high order positions of the divisor and the remainder to anticipate a negative result of the next subtraction.

2. Description of the Prior Art

Data processing systems commonly perform the decimal divide instruction by successive subtractions of the dividend by the divisor. The subtractions are carried out by aligning the most significant decimal digit positions of the dividend and divisor and subtracting a decimal digit at a time, least significant decimal digit position first. The high order quotient decimal digit is generated by counting the number of subtractions of the dividend by the divisor that gives a positive remainder. A negative subtraction result indicates that no further subtractions are needed, the divisor is added back to the remainder, and the unsuccessful subtraction is not counted.

The divisor is shifted over one digit position to the right and successive subtractions are made of the remainder to generate the next lower order quotient decimal digit. Such a divide technique is described in "Digital Computer Design Fundamentals" by Y. Chu, published by McGraw-Hill in 1962.

It was desirable to eliminate the last subtraction and add back steps to reduce the time period for executing the decimal divide instruction. This was accomplished by comparing the high order decimal digits after a subtraction to anticipate the negative result of the next subtraction. However, this test required a number of steps which reduced the throughput.

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

Accordingly, it is a primary object of the present invention to provide a processor having improved apparatus for executing the decimal divide instruction.

It is another object of the present invention to provide a processor having improved apparatus for anticipating the result of a subtraction when executing the decimal divide instruction.

SUMMARY OF THE INVENTION

A commercial instruction processor executes a decimal divide instruction by storing the divisor in an OP1 register and the dividend in an OP2 register. The content of an OP1A register points to the position of the least significant divisor decimal digit in OP1. The content of an OP2A register points to the decimal digit position in OP2 that aligns the most significant decimal digits of OP1 and OP2.

An arithmetic logic unit ALU1 subtracts each decimal digit in OP1 from the respective decimal digit in OP2 to generate a partial remainder decimal digit which replaces the OP2 decimal digit.

After the subtraction of the most significant divisor decimal digit in OP1 from the most significant dividend decimal digit in OP2 to generate a most significant partial remainder decimal digit which replaces the most significant dividend decimal digit, a test request signal is applied to a multiplexer. The multiplexer output signal is applied to ALU1 which subtracts the divisor most significant decimal digit from the most significant partial remainder decimal digit in OP2. If the result of the test subtraction is a positive decimal digit, then the divisor in OP1 is subtracted from the partial remainder in OP2. If the result of the test subtraction is a negative number indicating that another complete subtraction cycle of the divisor in OP1 from the partial remainder in OP2 would result in a negative remainder and an add back into OP2, then the following steps are taken. The most significant partial remainder decimal digit is transferred from OP2 to an MIER register. The initial contents of OP2A are incremented by hexadecimal ONE to essentially shift the divisor in OP1 one decimal digit position to the right. The quotient digit stored in an ALQR register is stored in a scratchpad memory. The quotient digit stores the number of subtractions of the divisor from the dividend that resulted in a positive partial remainder.

The divisor in OP1 is now subtracted from the partial remainder in OP2 and the result of the subtraction, the new partial remainder, is stored back in OP2. Each time the result of the subtraction is negative, MIER is decremented by decimal digit 1.

When MIER stores a decimal digit 0, then during each subtraction cycle, after the most significant divisor decimal digit in OP1 is subtracted from the most significant partial remainder decimal digit to generate the new most significant partial remainder decimal digit, then the test request signal is applied to the multiplexer. The multiplexer output conditions the ALU to subtract the most significant divisor decimal digit from the new partial remainder most significant digit. A negative answer indicates that this subtraction sequence is completed, the quotient is stored in scratchpad memory, the new partial remainder decimal digit is transferred from OP2 to MIER, and OP2A is incremented.

The novel features which are believed to be characteristic of the invention both as to its organization and method of operation, together with further objects and advantages, will be better understood from the following description when considered in connection with the accompanying drawings. It is expressly understood, however, that each of the drawings is given for the purpose of illustration and description only and is not intended as a definition of the limits of the present invention.

BRIEF DESCRIPTION OF THE DRAWINGS

FIG. 2 is a block diagram of the commercial instruction processor 10.

FIG. 3 is a block diagram of that portion of the CIP 10 that relates to the decimal multiply operation.

FIG. 4 is a detailed logic diagram which includes the multiply read only memory 54 which stores the products and the multiply register 52 which stores the multiplier digit.

FIG. 5 is a detailed logic diagram of the carry operation.

FIG. 6 shows the elements of a decimal divide example used to describe the invention.

DESCRIPTION OF THE PREFERRED EMBODIMENT

Figure 1:
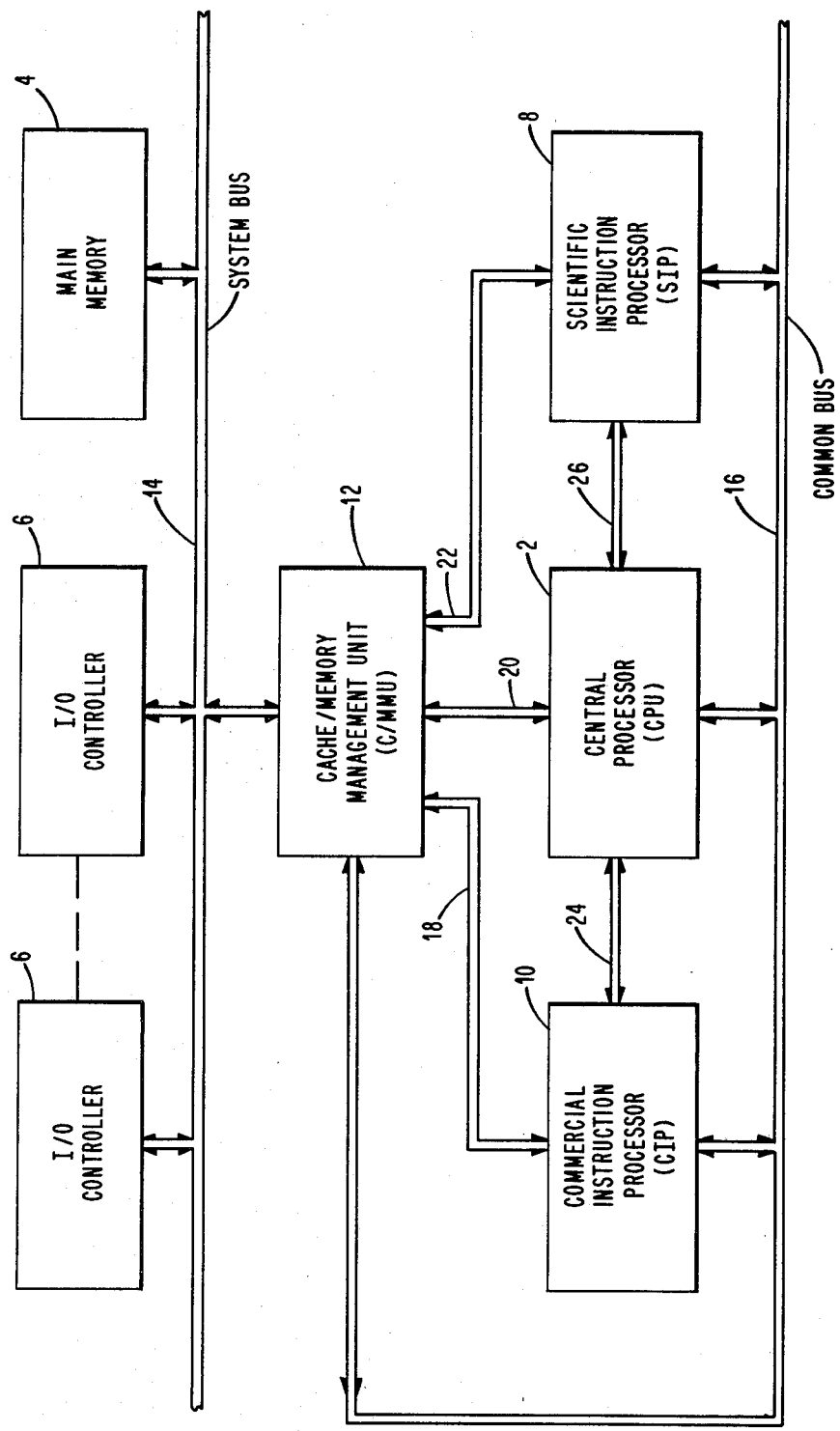
FIG. 1 is a block diagram of the overall data processing system.

FIG. 1 is an overall block diagram of a data processing system which includes a main memory 4, a plurality of input/output controllers 6 and a cache/memory management unit (C/MMU) 12; all coupled in common to a system bus 14. Coupled to the C/MMU 12 are a central processor unit (CPU) 2, a commercial instruction processor (CIP) 10 and a scientific instruction processor (SIP) 8 via buses 20, 18 and 22 respectively. The C/MMU 12, CIP 10, CPU 2 and SIP 8 are coupled in common to a common bus 16. Also, CPU 2 is coupled to the CIP 10 and the SIP 8 via buses 24 and 26 respectively.

The CIP 10 executes a set of instructions designed to facilitate the processing of character strings and decimal data. The SIP 8 executes a set of scientific instructions particularly useful for FORTRAN applications. This set includes arithmetic operations on single and double precision floating point operands and single and double word integer operands.

All instructions in a program under execution are received by CPU 2 from C/MMU 12 via buses 16 and 20. CPU 2 determines from the operation code of the instructions if the instruction is to be processed by the CPU 2, the CIP 10, or the SIP 8. The CPU 2 receives status information from the CIP 10 or SIP 8 over buses 24 and 26 respectively. If the CIP 10 or SIP 8 is available, the CPU 2 sends the necessary information out on common bus 16 and also bus 26 for the SIP 8. The CIP 10 or the SIP 8 processes the instruction and is operative with the C/MMU 12 via bus 18 or 22 respectively and bus 16 for processing the instruction.

The CIP 10 processes instructions which include the following:
1. Decimal arithmetic operations on string and packed numeric data.
2. Alphanumeric and decimal move and compare instructions.
3. Conversion between binary and decimal numeric representation.
4. Edit instructions.
5. Arithmetic shift instructions.

Main memory 4 stores instructions and data and is operative with the C/MMU 12 for the transferring of instructions and data over system bus 14 under control of CPU 2 via bus 20. This operation is described in U.S. Pat. No. 4,030,075.

The C/MMU 12 which includes a cache memory stores the instructions and data currently being processed by the CPU 2, CIP 10 and SIP 8. The cache operation is described in U.S. Pat. No. 4,195,340.

The CPU 2 is also operative for initiating transfers of data between the I/O controllers 6 and main memory 4.

Referring to FIG. 2, all CIP 10 operations except initialization operations from a console are initiated by CPU 2 writing a 6 bit function code into a function code register 96 and a 32 bit double word of data into a portion of a common bus data interface 80 via common bus 16. The CIP 10 when activated transfers the low order 6 bits of the double word into an instruction register 56. If the function code register 96 stores an output task function code $07_{16}$, then the low order 16 bits of the double word are stored in a portion of an address control unit 82 to allow the CPU 2 to request the previous instruction word at a later time.

The contents of function code register 96 select a firmware word in a control store 60 via control store addressing logic 58. The firmware word is loaded into a control store data register 62 and conditions CIP 10 to receive additional control information from CPU 2. A control store decode logic 61 generates control signals by decoding the output signals RD 00-67+ from control store data register 62. Signals RD 52-67+ applied to control store addressing logic 58 results in control store 60 branching to a specified address location.

The CIP 10 instructions operate on three data types, decimal strings containing binary coded decimal digits, alphanumeric strings containing ASCII characters and binary numbers having 16 or 32 bit precision. Decimal data operands are referenced by the location of the most significant digit and length and may have one or two digits in a byte. Packed decimal operands store two digits per byte and string decimal operands store one digit per byte.

String decimal operands may be unsigned and, assumed positive, may have a leading sign byte placed before the most significant decimal byte, a trailing sign byte placed after the least significant decimal byte or a trailing overpunched sign included with the least significant decimal byte.

Packed decimal operands may be unsigned implying a positive sign or have a trailing sign.

Binary data operands have the most significant binary bit as a sign bit with the binary point assumed to the right of the least significant binary bit using 2's complement notation.

The double words received by CIP 10 from CPU 2 following the instruction word specifying a decimal arithmetic operation indicates the decimal type, string or packed, sign information, the length of the operand and the effective address. This is the address of the byte containing the most significant character (4 or 8 bits/character).

Initially during the processing of a decimal numeric instruction, control store 60 generates signals via control store data register 62 causing the address control unit 82 to send the main memory 4 address of the operand 1 word containing the sign character to C/MMU 12. The operand 1 word containing the sign character is received by common bus data interface 80 and stored in OP1 64 and OP2 66. The sign character is selected by selector 70 for transfer to a sign decode overpunch encode logic 74 where it is decoded into status bits indicating an illegal sign or a negative sign. The control store addressing logic 58 is responsive to the illegal sign status bit and the negative sign status bit. If the sign is legal, then the negative sign status bit is stored in the microprogram status register 94. The operand 2 word containing the sign is processed in a similar manner and stored in OP2 66. Selector 70 transfers the sign character to sign decode overpunch encode logic 74 where it is decoded into the illegal sign or the negative sign and stored in the microprogram status register 94. This allows the CIP 10 to abort the instruction and notify the CPU 2 if an illegal sign was detected.

A decimal add instruction is indicated by an output task function code, $07_{16}$ and the instruction register 96 storing hexadecimal $2C_{16}$. During the execution of the decimal add instruction, operand 1 is added to operand 2 and the result of the addition is stored in the location in main memory 4 that stored operand 2.

The CIP 10 waits for the CPU 2 to send the additional control information required for the CIP 10 to execute the decimal add instruction. The additional control information consists of up to 3 double words describing operand 1 and up to 3 double words describing operand 2. The last double word received from the CPU 2 is an output last data descriptor indicated by a function code of $1F_{16}$.

The first of the 3 double words for each operand contains the effective virtual byte address of the operand which indicates the start of the operand in main memory 4, that is, the leftmost or lowest addressed byte containing some of the operand. The second double word may contain an indirect length. The third double word contains the data descriptor which specifies the data type and the position within the initial word received from main memory 4 of the start of the operand. The six double words are stored in the address control unit 82.

The output of instruction register 56 addresses a word in control store 60 to start the CIP 10 execution of the decimal add instruction by sending the main memory 4 address for the low order word of operand 1 containing the least significant decimal digits to the C/MMU 12 via bus 18. The first word of operand 1 is read from main memory 4 or from a cache memory (not shown) in C/MMU 12 and transferred to CIP 10 via common bus 16 and stored in OP1 64. Similarly, the low order word of operand 2 is received by CIP 10 and stored in data scratchpad unit 50 and in OP2 66.

The bit of each data descriptor word describing the characteristics of the two operands (ASCII string or packed) and the computed position of the least significant decimal digit in their respective low order words for operands 1 and 2 are stored in OP1A 84 and OP2A 78 respectively. In addition, the length of operands 1 and 2 is stored in descriptor operand length processing logic 88. The operation of operand length processing logic is described in copending related application Ser. No. 219,809 entitled "A Data Processor Using Read Only Memories for Optimizing Main Memory Access and Identifying the Starting Position of an Operand". The OP1A 84 output is applied to a selector 68 and the OP2A 78 output is applied to a selector 70 for selecting the operand 1 and operand 2 decimal digits as they are transferred from OP1 64 and OP2 66 for processing by a decimal/binary ALU 76, one decimal digit at a time. The resulting decimal digit of the addition is transferred from ALU 76 to OP2 66 via an internal bus (BI) 100, replacing the operand 2 decimal digit that contributed to this result. The operations of OP1A 84 and OP2A 78 are described in copending related application Ser. No. 220,220 entitled "A Data Processor Having Apparatus for Controlling the Selection of Decimal Digits of an Operand When Executing Decimal Arithmetic Instructions" and application Ser. No. 220,219 entitled "A Data Processor Using a Read Only Memory for Selecting a Part of a Register Into Which Data is Written".

OP1A 84 keeps track of the number of decimal digits remaining in OP1 64 from the transfer of the low order word. When the last decimal digit from the low order word is read from OP1 64 to ALU 76, OP1A 84 signals the branching logic in control store addressing logic 58 to address a word in control store 60 which fetches the next word of operand 1 from main memory 4 via C/MMU 12. The address of the next word of operand 1 is sent from address control unit 82 to C/MMU 12 via bus 18.

Similarly, OP2A 78 signals the branching logic in control store addressing logic 58 to enter into a firmware routine to transfer the resulting word of the addition stored in OP2 66 to common bus data interface 80 for transfer to main memory 4 via common bus 16 to C/MMU 12 at the location specified by the address from address control unit 82 over bus 18. A copy of the result is stored in data scratchpad unit 50. A read cycle is initiated to read the next word of operand 2 by sending the next address from address control unit 82 to C/MMU 12 via bus 18.

When the processing of all of the decimal digits from operand 1 or operand 2 is completed, descriptor operand length processing logic 88 controls the filling out of the field of the result in accordance with the remaining decimal digits of the longer operand.

Initially during the multiply instruction execution, the entire multiplicand, operand 2, is transferred from main memory 4 to the data scratchpad unit 50 via common bus data interface 80 and BI bus 100. A multiplier double word of operand 1 is transferred to OP1 64 via common bus data interface 80 and BI bus 100. The least significant multiplier digit is read into a multiply register/counter 52 from OP1 64 via BI bus 100 and is applied to the input address terminals of a multiply programmable read only memory (PROM) 54. Each double word of the multiplicand in turn is transferred to OP1 64 from the data scratchpad 50. Each multiplicand digit in turn is applied to the remaining input address terminals of PROM 54 from OP1 64 via selector 68 to generate the partial product digits. Each partial product digit is applied to ALU 76 via selector 68 where it is added to a corresponding decimal digit stored in OP2 66 and the resultant partial product stored back in OP2 66.

The next multiplier digit is read into multiply register/counter 52 and the output applied to PROM 54.

Again each multiplicand digit in turn is applied to PROM 54 and the partial product digits are applied to ALU 76 via selector 68 where they are added to the selected partial product digits stored in OP2 66. Here again, OP2A 78 controls selector 70 to select the partial product digit to be applied to ALU 76. The partial product result from ALU 76 is again stored in OP2 66 via BI bus 100.

When all of the multiplicand digits stored in data scratchpad unit 50 have been applied to the input address terminals of PROM 54 along with the most significant multiplier decimal digit output of multiply register/counter 52, the data scratchpad unit 50 contains the product of the multiplication. This product is written into main memory 4 via OP2 66, common bus data interface 80 and common bus 16.

A decimal division instruction is executed by receiving the dividend and divisor in common bus data interface 80 from C/MMU 12 via common bus 16 for storage in the data scratchpad unit 50. Portions of the divisor are stored in OP1 64 in turn and portions of the dividend/partial remainder are stored in OP2 66 in turn. The CIP 10 executes the decimal divide instruction by a series of successive subtractions and counting the number of successful subtractions in an ALQR register/counter 72. A successful subtraction is one in which the result is a positive number.

The divisor in OP1 64 is applied to ALU 76 through selector 68, a decimal digit at a time, the least significant decimal digit first. The dividend in OP2 66 is applied to ALU 76 through selector 70, a decimal digit at a time. OP2A 78 controls selector 70 to select the decimal digit from OP2 66 that would cause the most significant decimal digits of the divisor in OP1 64 to be aligned with the most significant decimal digit of the dividend for the subtraction operation.

The output of ALU 76 is stored in OP2 66 via BI bus 100 and the contents of ALQR 72 are incremented if the result of the subtraction of the high order decimal digits with the divisor is a positive number. The divisor in OP1 64 is again subtracted from the result of the previous subtraction which is stored in OP2 66 and the contents of ALQR 72 again are incremented if the result of the subtraction is positive.

When the result of the subtraction is a negative number, the divisor stored in OP1 64 is then added to OP2 66 and the contents of ALQR 72 containing a quotient digit are transferred to the data scratchpad unit 50. OP2 66 and data scratchpad unit 50 now contain the result of the last successful subtraction in the high order decimal digits and the remaining decimal digits are the original low order decimal digits of the dividend.

The divisor is subtracted from the dividend one digit position to the right of the previous set of subtractions to develop the next quotient digit. The subtraction operation is repeated as described above with ALQR 72 being incremented for each positive result of the subtraction.

The first quotient digit stored in data scratchpad unit 50 is transferred to OP2 66 via BI bus 100. The contents of ALQR 72 containing the second quotient digit is transferred to OP2 66 via selector 68, ALU 76 and internal bus 100 where it is appended to the first quotient digit for storage in the data scratchpad unit 50. The partial dividend is transferred back to OP2 66 from the data scratchpad unit 50.

The shifting of the divisor and subsequent subtraction operations are repeated until after computing a quotient digit with the least significant decimal digit of the divisor aligned with the least significant decimal digit of the dividend. The last quotient decimal digit from ALQR 72 is merged with the rest of the quotient in the data scratchpad unit 50 and the portion of the remainder now stored in OP2 66 is stored into the data scratchpad unit 50 via BI bus 100. The quotient and remainder in data scratchpad unit 50 are then stored in main memory 4.

A CIP indicator register 90 is set by the control signals to indicate the status of CIP 10. Register 90 includes an overflow indicator which is set during decimal operations when the receiving field cannot store all significant digits of the resultant or a divide by zero is detected. A truncation indicator is set during alphanumeric operations when the receiving field cannot contain all characters of the result. A sign fault indicator is set during decimal operations when a negative result is stored in an unsigned field. A greater-than indicator is set during the execution of certain decimal and alphanumeric instructions when the result is greater than zero for decimal numeric operations or operand 1 is greater than operand 2 for decimal or arithmetic comparisons. A less-than indicator is set during the execution of certain decimal and alphanumeric instructions when the result is less than zero for decimal arithmetic instructions or operand 1 is less than operand 2 for either decimal or alphanumeric comparisons.

A CIP mode register 92 stores an overflow trap mask and a truncation trap mask which are indications of which special action the CIP 10 and CPU 2 should take when the overflow or truncation condition arises.

A system clock logic 86 includes a 160 nanosecond four phase clock that provides clock signals to trigger all CIP 10 registers and all test and control flops, stabilize registers after loading, signify that address, data, control and parity are valid allowing initiation of a local bus cycle. In addition, the system clock logic 86 may be stalled when additional time is required to complete certain CIP 10 functions. The system clock logic 86 generates a BUSY signal over common bus 16 to indicate to CPU 2 that the CIP 10 is not available, receives a DCN signal from the C/MMU 12 bus to signal the CIP 10 that data for the CIP 10 is on the common bus 8, generates a REQUEST for use of the common bus 16, and waits for a GRANT from the C/MMU 12.

The microprogram status register 94 in addition to storing operand sign information also stores an indication if an overflow was detected in executing a decimal numeric instruction, whether an encode or a decode overpunched sign operation is required, and when a decimal add operation is completed.

Referring to FIG. 3, the data scratchpad unit 50 includes a register file D (RFD) 50-1, a register/counter (AA) 50-2, a register/counter (AB) 50-3 and a MUX 50-4. RFD 50-1 includes 8 4-bit random access memories organized to store 16 32-bit double words. RFD 50-1 is addressed from either AA 50-2 via signals RFDAA 0-3+, MUX 50-4 and signals RFDAD 0-3+, or from AB 50-3 via signals RFDAB 0-3+, MUX 50-4 and signals RFDAD 0-3+. RFD 50-1 is coupled to BI bus 100 via signals BIDT 00-31−. AA 50-2 and AB 50-3 are loaded from BI bus 100 via signals BIDT 8-11+. During the decimal multiply operation, AA 50-2 stores the location in RFD 50-1 of the multiplicand words and AB 50-3 stores the location of the partial product words.

The descriptor operand length processing logic 88 includes a counter 1 88-1, a counter 2 88-2 and a counter 3 88-3 coupled to a MUX 88-4 via signals CTR1 0-3+, CTR2 0-3+ and CTR3 0-3+ respectively, and coupled to a MUX 88-5 via signals CTR 4-7+, CTR2 4-7+ and CTR3 4-7+ respectively. Signals RD 16-19+ are applied to MUX 88-4 and signals RD 20-23+ are applied to MUX 88-5 to provide miscellaneous constants for transfer onto BI bus 100. Output signals CTKT 0-3+ of MUX 88-4 are coupled to their respective signals CTBI 0-3+. Output signals CTKT 4-7+ of MUX 88-5 are coupled to their respective signals CTBI 4-7+. Signals CTBI 0-3+ are coupled through MUX 76-11 to BI bus 100 signals BIDT 0-3+, BIDT 8-11+, BIDT 16-19+ and BIDT 24-27+ respectively. Signals CTBI 4-7+ are coupled through MUX 76-11 to BI bus 100 signals BIDT 4-7+, BIDT 12-15+, BIDT 20-23+ and BIDT 28-31+ respectively. Counter 1 88-1, counter 2 88-2 and counter 3 88-3 are loaded from BI bus 100 via signals BIDT 16-23+. During a portion of the decimal multiply operation, counter 1 88-1 stores the number of decimal digits in operand 1, and counter 2 88-2 stores the number of decimal digits in operand 2. During another portion of the decimal multiply operation, counter 1 88-1 and counter 2 88-2 store the number of multiplicand decimal digits remaining to be applied to multiply PROM 54 for the multiplier digit stored in multiply register (MIER) 52. Counter 3 88-3 may store the number of decimal digits of the multiplier remaining for processing or the effective length of the multiplicand.

The decimal binary ALU 76 includes a 4-bit arithmetic logic unit (ALU1) 76-2 for processing decimal numeric arithmetic operations and a 4-bit arithmetic logic unit (ALU2) 76-3 for processing alphanumeric operations and code conversions such as binary to decimal and decimal to binary. The ALU1 output signals ALUDG 0-3+ are applied to a MUX 76-8, a MUX 76-9 and a decimal correction unit 76-7. Output signals ALXS 60,61+ and ALUDG2— from decimal correcton 76-7 are applied to MUX's 76-8 and 76-9. MUX 76-8 output signals CTBI 0-3+ and MUX 76-9 output signals CTBI 4-7+ are applied to MUX 76-11 as previously described. The output signals RFDAD 0-3+ of MUX 50-4 are applied to MUX 76-11. Output signals OP1X 00-31+ from RFD 50-1 and OP1 64 are applied to MUX 76-11 as are the output signals OP2D 00-31+ from OP2 66. The outputs of OP1A 84 and OP2A 78, signals OP1AD 0-2+, OP1TYP+, OP2AD 0-2+ and OP2TYP+, are applied to MUX 76-11 and appear at the MUX 76-11 output as signals BIDT 12-15+. Also applied to MUX 76-11 are signals SLQR+ from ALQR 72 and MIER+ from MIER 52 and appear at the MUX 76-11 output as signal BIDT 28-31+ and BIDT 20-23+.

The output of ALU2 76-3, signals ALUZN 0-3+, is applied to a MUX 76-10. Also, a hexadecimal 3 is applied to MUX 76-10 whose output signals ALZON 0-3+ are applied to MUX 76-11.

A register file C (RFC) 82-1 is coupled to the BI bus 100. Selected signals of BI bus 100, BIDT 00-31+, are stored in positions A,0-23 of RFC 82-1. The logic selecting the input bit positions is not shown since it is not pertinent to the invention. Output signals RFC A,0-23+ from RFC 82-1 are applied to MUX 76-11 and appear on BI bus 100 as signals BIDT 7-31+.

A units carry 76-5 and a tens carry 76-6 are coupled to ALU1 76-2 via a MUX 76-4. During the decimal multiply operation, the units carry 76-5 is operative when the multiply PROM 54 generates the units position decimal digit and the tens carry 76-6 is operative when the multiply PROM 54 generates the tens position decimal digit. The carry operation is described in copending related application Ser. No. 219,810 entitled "A Data Processor Having Units Carry and Tens Carry Apparatus Supporting a Decimal Multiply Operation".

During the decimal multiply operation, a double word of the partial product is stored in OP2 66 and a double word of the multiplicand is stored in OP1 64. The OP2 66 output signals OP2D 00-31+ are applied to selector 70. The OP2A 78 output signals OP2AD 0-2+ and OP2TYP+ enable selector 70 to transfer the selected decimal digit to terminal A of ALU1 76-2 via signals AL2DG0+. The OP1A 84 output signals OP1AD 0-2+ and OP1TYP+ enable selector 68 to transfer the selected multiplicand digit, received via signals OP1X 00-31+, to multiply PROM 54 via signals OP1DG 0-3+. The output of multiply PROM 54, signals MULDG 0-3+, is applied to terminal B of ALU1 76-2 as signals AL1DG 0-3+. The sum is transferred back to OP2 66 in the selected partial product digit position vis MUX 76-8 or 76-9 and MUX 76-11 via BI bus 100.

A MUX 68-1 transfers the output of ALQR 72, signals ALQR 0-3+, or the output of selector 68-2, signals OP1DG 0-3+, to terminal B of ALU1 76-2 via signals OP1QD 0-3+ and AL1DG 0-3+. Typically, an operand 1 decimal digit in OP1 64 or RFD 50-1 and an operand 2 decimal digit in OP2 66 may be combined in ALU1 76-2 or the contents of ALQR 72 may be combined with a selected decimal digit position in OP2 66 during a divide operation.

RFC 82-1 of the address control unit 82 stores the instruction and the data descriptors describing the characteristics of the operands. RFC 82-1 is made up of 6 4-bit random access memories and a portion of a seventh random access memory organized as 16 25-bit words. Certain locations of RFC 82-1 are used as a scratchpad memory to temporarily store the contents of the various register/counters including AA 50-2, AB 50-3, counter 1 88-1, counter 2 88-2 and counter 3 88-3.

The decimal correction 76-7 is active during the arithmetic operation. BCD coded decimal digits are added by first modifying the selected OP2 66 digit in selector 70 by increasing its binary value by 6 (excess 6 code). When the modified OP2 66 digit (appearing as signals AL2DG 0-3+) is added to the unmodified digit selected from OP1 64 by the binary ALU1 76-2, the binary carry out of ALU1 76-2 is equivalent to a decimal carry. If a carry out is asserted, then the output of ALU1 76-2 appearing on signals ALUDG 0-3+ is the correct BCD representation of the sum. If carry out is not asserted, then ALUDG 0-3+ is an excess 6 representation of the sum and the decimal correction logic is activated to reduce this sum by 6 to produce the correct BCD representation.

Referring to FIG. 4, the multiply PROM 54 includes a read only memory (PROM) 54-1 and a negative logic OR gate 54-2 which enables the PROM 54-1 via signal MULENB—. PROM 54-1 has the capacity for storing 512 decimal digits, 256 units position decimal digits and 256 tens position decimal digits.

The multiply register 52 includes a register/counter 52-1, a negative logic OR gate 52-3 and a negative AND gate 52-2. The register/counter 52-1 stores each multiplier digit in turn from the least significant multiplier digit to the most significant multiplier digit. The register/counter 52-1 is also used as a counter by the CIP 10 during the setup of the decimal multiply operation to store a count of the number of multiplicand double words that remain in main memory 4 prior to transfer to the CIP 10. The selector 68 includes the MUX 68-1. The selector 68-2 applies a selected multiplicand digit over signals OP1DG 0-3+ to the 8, 4, 2 and 1 input address terminals of PROM 54-1. The register/counter 52-1 applies the multiplier digit over signal lines MIER 0-3+ to the 128, 64, 32 and 16 input address terminals of PROM 54. The units position of the product appears on output signals MULDG 0-3+ when the PROM 54-1 is enabled by signal MULENB— at logical ZERO and signal MULUNT— at logical ZERO. The tens position of the product appears on the output signals MULDG 0-3+ when PROM 54-1 is enabled and signal MULUNT— is at logical ONE.

The Boolean equation for signal MULUNT— at logical ZERO is:

MULUNT—=[((RD08·RD09·RD-10·RD11)+RD16+RD17+RD18+RD19)(RD-46·RD47·RD48·RD49)]

Either the tens multiplication signal MULTNS— or the units multiplication signal MULUNT— at logical ZERO applied to negative logic OR gate 54-2 enables PROM 54-1 by forcing signal MULENB— to logical ZERO.

The Boolean equation for signal MULTNS— at logical ZERO is:

MULTNS—=[((RD08·RD09·RD-10·RD11)+RD16+RD17+RD18+RD19)(RD-46·RD47·RD48·RD49)]

Register/counter 52-1 is operative as a counter when keeping track of the number of double words of the multiplicand remaining in main memory 4 when the CIP 10 is being conditioned to perform the decimal multiply instruction. Register/counter 52-1 is decremented at CLOCK2— time when logic signal DCMIER— is at logical ZERO, forcing the output of NOR gate 52-3, enable signal MIERCT—, to logical ZERO and enabling the −1 terminal.

The Boolean equation of signal DCMIER— at logical ZERO is:

DCMIER—=[(RD08+RD09+RD10+RD11)(R-D16·RD17·RD18·RD19)]

When register/counter 52-1 is decremented to hexadecimal ZERO, signal MIEREO+ is forced to logical ONE, thereby signalling the control store addressing logic 58 that the transfer of multiplier double words from main memory 4 is concluded after the next transfer.

Register/counter 52-1 is loaded with the number of double words and each multiplier hexadecimal digit in turn from BI bus 100 at CLOCK2— time when signal MIERLD— is at logical ZERO. Signal MIERLD— is applied to the LOAD terminal of register/counter 52-1.

The Boolean equation for signal MIERLD— at logical ZERO is:

MIERLD—=[((RD08·RD09·RD-10·RD11)+RD16+RD17+RD18+RD19)(RD-46·RD47·RD48·RD49)]

A multiplier digit of hexadecimal ZERO forces signal MIEREO+ to logical ONE which signals the control store addressing logic 58 to bring in the next multiplier hexadecimal digit into register/counter 52-1.

MUX 76-1 provides a high impedance for signals OP1QD 0-3+ when the enable signal output of an inverter 54-3, MULENB+, is at logical ONE. The PROM 54-1 is enabled since signal MULENB— is at logical ZERO and output signals MULDG 0-3+ appear on signal lines AL1DG0+. During the loading of register/counter 52-1, the hexadecimal digit is transferred from OP1 64 in FIG. 3, selector 68, MUX 76-1, ALU1 76-2, MUX 76-9, MUX 76-11 and BI bus 100 signals BIDT 20-23+.

Referring to FIG. 4, output signals OP1DG 0-3+ are applied to terminal 1 of MUX 76-1. Output signals OP1QD 0-3+ are applied to terminal B of ALU1 76-2 via signals AL1DG 0-3+. Signal AQRSEL— is at logical ONE and signal MULENB+ is at logical ZERO.

The Boolean equation for AQRSEL— at logical ONE is:

AQRSEL—=[(RD08+RD09+RD10+RD11)(RD-16·RD17·RD18·RD19)]

The ALQR 72 signals ALQR 0-3+ are applied to the terminal 0 of MUX 76-1.

It should be noted that the sequences of operation are controlled by the output signals RD 00-67+ from control store data register 62, FIG. 2. The control signals described by the Boolean equations are output signals from control store decode logic 61. (The Boolean notation [RD08·(RD09+RD10)] indicates an output of logical ONE when signal RD08 is at logical ONE and either or both signal RD09 is at logical ZERO or signal RD10 is at logical ONE.)

Register/counter 52-1 is a 74S169 logic circuit and MUX 76-1 is a 74S257 logic circuit described in "The TTL Data Book for Design Engineers", Second Edition, Copyright 1976, and published by Texas Instruments Inc.

PROM 54-1 is a 5624 logic circuit described in the "Intersil Semiconductor Products Catalog" published by Intersil Inc., 10900 N. Tantau Avenue, Cupertino, Calif. and issued March, 1974.

FIG. 5 shows the detailed carry logic associated with ALU1 76-2 and ALU2 76-3. The decimal multiply operation as described in copending related application Ser. No. 220,218 entitled "A Data Processor Performing a Decimal Multiply Operation Using a Read Only Memory" uses the PROM 54-1 of FIG. 4 to read out the units digit and the tens digit for each multiplicand and multiplier digit. The partial product is developed by adding the units digit to a selected digit of the partial product and setting a units carry flop 76-5 if a carry resulted, and adding the tens digit to a next higher selected digit of the partial product and setting a tens carry flop 76-6 if a carry resulted. The output of the units carry flop 76-5, signal CARYFF—, is selected by a MUX 76-40 during the cycle in which the next units digit output of PROM 54-1 is added to the next higher selected digit of the partial product. The output of the tens carry flop 76-6, signal TNSCRY—, is selected by MUX 76-40 during the development of the next tens partial product.

MUX 76-40 selects the units carry output signal CARYFF— when signal CIFRFC— is at logical ONE and signal MULTNS— at logical ONE indicates a units carry, and selects the tens carry output signal TNSCRY— when signal CIFRFC— is at logical ONE and signal MULTNS— at logical ZERO indicates a tens carry. The MUX 76-40 output signal ALUCIN— at logical ZERO applied to ALU1 76-2 adds the carry to the arithmetic operation performed by ALU1 76-2. A carry output signal ALUCN4— is forced to logical ZERO when a carry results from the arithmetic operation performed on the digits applied to ALU1 76-2. Signal ALUCN4— applied to the D terminal conditions flop 76-6 to reset. Signal ALUCN4— applied to a NOR gate 76-52 forces signal CRYDEC+ to logical ONE, forcing signal CRYOUT+, the input to terminal D, to logical ONE conditioning flop 76-5 to set. Flop 76-5 sets on the rise of clock signal CARYCK— to store the units carry and flop 76-5 resets on the rise of clock signal LDTNSC— to store the tens carry.

Clock signal CARYCK—, the output of negative AND gate 76-64, rises on the rise of clock signal CLOCK2— with signal LDCRYF— at logical ZERO. Clock signal LDTNSC—, the output of negative AND gate 76-63, rises on the rise of clock signal CLOCK2— with signal MULTNS— at logical ZERO.

Control store decode logic 61 conditions the setting of units carry flop 76-5 during the processing of a decimal instruction by forcing signal ALUSDO— to logical ZERO, forcing signal CDCRYF— to logical ZERO via a NOR gate 76-62, signal ALSBDO+ and a NAND gate 76-61 with signal MULTNS— at logical ONE. Also, signal ALUSDO+, the output of an inverter 76-66, at logical ONE conditions NOR gate 76-52 to be responsive to carry signal ALUCN4— from ALU1 76-2. Similarly, signal ALUSBO— is forced to logical ZERO to condition the units carry flop 76-5 during the processing of a binary instruction by forcing signal LDCRYF— to logical ZERO and the output of an inverter 76-65, signal ALUSBO+, to logical ONE. This conditions a NOR gate 76-51 to be responsive to the ALU2 76-3 carry signal ALUCN8— at logical ZERO to set units carry flop 76-5 via signals CRYOUT+. Also, ALU1 76-2 and ALU2 76-3 are coupled together during certain binary instructions and the carry out signal ALUCIN4— of ALU1 76-2 is coupled to the carry in terminal of ALU2 76-3.

The carry signals CARYFF— and TNSCRY— are applied to input terminals 1 and 3 respectively of MUX 76-40. Signal RFCLO8— is applied to input terminal 2 from RFC 82-1 when executing the binary hexadecimal conversion to introduce the current binary digit into a decimal doubling algorithm.

The input terminals are selected by control store decode logic 61 via signals CIFRFC— and MULTNS— applied to select terminals 1 and 2 respectively. During the decimal multiply instruction, the units carry signal CARYFF— is selected by forcing signals CIFRFC— and MULTNS— to logical ONE, the tens carry signal TNSCRY— is selected by forcing signal CIFRFC— to logical ONE and signal MULTNS— to logical ZERO via control store decode logic 61.

The carry in signal ALUCIN— may be forced to logical ZERO to indicate a carry early in a control cycle by forcing the enable input signal FRCICK+, the output of a NAND gate 76-41, to logical ONE when signal DIROFF— and the clock A+ signals are at logical ZERO. This is required during the divide operation to permit the test if the next subtraction would result in a negative remainder while at the same time the CARYFF+ signal is affecting the next control store address to indicate the success or failure of the previous subtract pass. The test is accomplished by subtracting the most significant digit of the divisor from the most significant digit of the remainder. If the result is negative, then there is no need to go through the full subtraction and add back sequence. During the test, signal ALUCIN— is forced to logical ZERO and forces the ALU1 76-2 resultant output to indicate the subtraction of the terminal B input signals from the terminal A input signals.

The CRYCLR— signal generated by control store decode logic 61 sets tens carry flop 76-6 and resets units carry flop 76-5 to clear the tens and units carry. This occurs near the end of a control cycle—too late to affect the next control store address if units carry flop 76-5 is being tested and too late to condition ALU1 76-2 reliably for the test described supra.

Flops 77-50 and 77-60 are 74S74 logic circuits and MUX 76-40 is a 74S153 logic circuit described in the aforementioned "TTL Data Book for Design Engineers".

The Boolean expressions for the control store decode logic signals are:

ALUBSO— = [(RD08+RD09+RD10+RD1-1)·RD16·$\overline{RD17}$·$\overline{RD18}$·RD19]

ALUDSO— = [(RD08+RD09+RD10+RD1-1)·RD16·$\overline{RD17}$·$\overline{RD18}$·RD19]

CRYCLR— = [(RD08+RD09+RD10+RD1-1)·$\overline{RD16}$·$\overline{RD17}$·RD18·RD19]

CRYSET— = [(RD08+RD09+RD10+RD1-1)·$\overline{RD16}$·$\overline{RD17}$·RD18·RD19]

CIFRFC— = [(($\overline{RD08}$·$\overline{RD09}$·$\overline{RD10}$·RD11)+$\overline{RD16}$+$\overline{RD17}$+$\overline{RD18}$+RD19)(RD-46·RD47·$\overline{RD48}$·RD49)]

DIROFF— = [(($\overline{RD08}$·$\overline{RD09}$·$\overline{RD10}$·RD11)+$\overline{RD16}$+$\overline{RD17}$+$\overline{RD18}$+RD19)(RD-46·RD47·RD48·$\overline{RD49}$)]

As described supra for the decimal divide instruction, assume initially that the entire divisor is stored in OP1 64, FIG. 3, and that the entire dividend is stored in OP2 66. (The full division algorithm uses RFD 50-1 to hold the operands, each of which may be 31 digits long. The proper moving of operands between OP1 64, OP2 66 and RFD 50-1 make a full subtraction pass and an add-back pass very expensive in time.) OP1A 84 is set to point to the least significant divisor digit in OP1 64 and OP2A 78 is set to point to the decimal digit position that allows the most significant digits of OP1 64 and OP2 66 to be aligned.

Each divisor digit is subtracted from its respective dividend digit by ALU1 76-2 and the remainder digit is stored back in the dividend digit position in OP2 66. The subtraction moves from the least significant digit to the most significant digit as OP1A 84 and OP2A 78 are decremented after each digit subtraction. At the end of a full subtraction pass, the following simultaneous actions occur:

1. The success or failure of the full subtract pass which is implied by the final state of the units carry flop 76-5 and whether MIER 52 does or does not contain decimal ZERO selects one of four control store 60 addresses indicating the next state of the machine.

2. ALQR 72 is incremented—anticipating that the subtract pass was successful.
3. Units carry flop 76-5 is set by signal CRYSET— at logical ZERO near the end of the control cycle—too late for this to affect the control store 60 address selection. This setting of the units carry flop 76-5 is in anticipation of the need for another full subtract pass.
4. The most significant digit of the divisor and the corresponding digit of the new partial remainder are compared. This comparison is meaningful only if MIER 52 contains a decimal ZERO and the previous full subtract resulted in a positive partial remainder, or if MIER 52 contains a decimal ONE and the previous full subtract pass resulted in a negative partial remainder. This comparison indicates that a subsequent subtract pass must fail if the most significant digit of the divisor is greater than the corresponding digit of the partial remainder. The logic of this test requires that the ALU1 76-2 carry-in signal ALUCIN— be at logical ZERO. This eventually happens as a result of action above, but too late to generate a valid ALUCN4— (the result of the comparison which is sampled at the end of every control cycle); therefore, ALUCIN— is forced low early in the control cycle by logic signal FRCICK+ at logical ONE.

If the subtraction pass resulted in a positive partial remainder and MIER 52 does not contain a decimal ZERO, then another full subtraction pass is made. If the full subtraction pass resulted in a positive partial remainder and MIER 52 contained a decimal ZERO, then the result of the one digit comparison is tested:

A. If the most significant digit of the divisor is less than or equal to the corresponding digit of the new partial remainder, then another full subtract pass is required;
B. If the most significant digit of the divisor is greater than the corresponding digit of the new partial remainder, then a quotient digit in ALQR 72 is stored in RFD 50-1, the divisor is shifted, and a new series of subtractions is started.

If the full subtract pass resulted in a negative partial remainder and MIER 52 does not contain either decimal ZERO or decimal ONE, then MIER 52 is decremented and the series of subtractions of the partial remainder by the divisor are repeated. If the full subtract pass resulted in a negative partial remainder and MIER 52 contains a decimal ONE, then MIER 52 is decremented and the result of the one digit comparison is tested as previously described. If the subtract pass resulted in a negative partial remainder and MIER 52 contains a decimal ZERO, then the following actions are taken:

A. Decrement ALQR 72;
B. Perform an add back of the divisor in OP1 64 into OP2 66.

At the end of each series of subtractions, the OP2A 78 starting value is incremented by hexadecimal 1 resulting in a one decimal digit position shift. Also, the previous most significant digit of the partial remainder is stored in MIER 52. The contents of ALQR 72 are stored with the rest of the quotient in RFD 50-1 and ALQR 72 is set to decimal ZERO. If another quotient digit is needed, the previous subtraction sequence is repeated.

Referring to FIG. 5, the test is initiated by forcing signal DIROFF— to logical ZERO. At CLOCKA+ time the output of MUX 76-40, signal FRCICK+ at logical ONE, forces the output signal ALUCIN— to logical ZERO, thereby forcing a carry into ALU1 76-2. The most significant divisor digit, signals AL1DG 0-3+, FIG. 3, is applied to terminal B of ALU1 76-2 and the corresponding digit from OP2 66, signals AL2DG 0-3+, is applied to terminal A of ALU1 76-2. ALU1 76-2 is programmed to subtract when signals ALUSF0+ and ALUFS3+ are at logical ZERO, signals ALUSF0— and ALUFS1+ are at logical ONE and carry signal ALUCIN— is at logical ZERO. Subtraction is accomplished by the 1's complement addition where the 1's complement of the subtrahend is generated internally in ALU1 76-2. The resultant output is A-B-1. Forcing signal ALUCIN— to logical ZERO provides the resultant output of A-B.

If the result of the subtraction is a positive number as indicated by carry out signal ALUCN4— at logical ZERO setting a history flop (not shown) in control store addressing logic 58 which is tested immediately following the control cycle, then the divisor is again subtracted from the partial remainder in OP2 66.

If the result of the subtraction is a negative number as indicated by carry out signal ALUCN4— at logical ONE, then another subtraction sequence of the divisor in OP1 64 from the partial remainder in OP2 66 is not required and OP1A 84 is reset to point to the least significant divisor digit and OP2A 78 is reset to point to the partial remainder digit which essentially shifts the divisor one position to the right to prepare for the generation of next quotient digit in ALQR 72.

During the generation of the next quotient digit, MIER 52 may store the most significant digit of the partial remainder. When the most significant digit of the divisor is subtracted from the next most significant digit of the partial remainder during the full subtraction pass resulting in a negative number, the content of MIER 52 is decremented.

The divisor is subtracted repeatedly from the partial remainder, decrementing MIER 52 each time a borrow is required. When MIER 52 stores a decimal ZERO, the test is made by subtracting the most significant decimal digit of the divisor from the now most significant partial remainder decimal digit to determine if a further subtraction is required to develop the quotient digit stored in ALQR 72.

As an example as shown in FIG. 6, step 1, a dividend of 67 is stored in OP2 66 and a divisor of 5 is stored in OP1 64. Initially, the contents of MIER 52 are decimal ZERO. Flop 76-5, FIG. 5, is set since signal CRYSET— is forced to logical ZERO, forcing signal CARYFF— to logical ZERO. Terminal 3 of MUX 76-40 is selected since signals CIFRFC— and MULTNS— are at logical ONE and the signal FRCICK+ is at logical ZERO. This forces the carry signal ALUCIN— to logical ZERO. OP1A 84 points to the position of OP1 64 storing the divisor decimal digit 5 and OP2A 78 points to the position of OP2 66 storing the dividend decimal digit 6.

As a result of the subtraction in ALU1 76-2 of decimal digit 6 by decimal digit 5 shown in step 2, the partial remainder decimal digit 1 replaces the decimal digit 6 in OP2 66. Carry signal ALUCN4— from ALU1 76-2 at logical ZERO indicates a positive partial remainder. This is copied into units carry flop 76-50.

In step 3, the content of ALQR 72 is incremented and stores a quotient digit of decimal 1. Test signal FRCICK+ is forced to logical ONE forcing the output signal ALUCIN− to logical ZERO. The most significant partial remainder decimal digit 1 is compared with the most significant divisor decimal digit 5 in ALU1 76-2. Carry signal ALUCN4− is at logical ONE indicating to the control store addressing logic 78 in step 4 that no further subtractions are required. The most significant partial remainder decimal digit 1 is stored in MIER 52 and the initial content of OP2A 78 is incremented to point to the decimal digit 7.

The quotient decimal digit 1 stored in ALQR 72 is transferred to scratchpad memory RFD 50-1 during step 5 and ALQR 72 is cleared. The state of signal ALUCIN− is immaterial during steps 4 and 5.

During step 6, divisor decimal digit 5 is subtracted from dividend decimal digit 7. The partial remainder decimal digit 2 replaces decimal digit 7 in OP2 66. Carry signal ALUCN4− at logical ZERO indicates that the result of the subtraction was a positive number and flop 76-50 remains set.

During step 7, MIER 52 not storing a decimal digit 0 and signal ALUCN4− at logical ZERO in step 6 call for another subtract cycle. Signal FRCICK+ forces signal ALUCIN− to logical ZERO. ALQR 72 is incremented to store quotient decimal digit 1.

During step 8, decimal digit 5 is subtracted from partial remainder decimal digit 2. This results in a partial remainder decimal digit of 7 which replaces the partial remainder decimal digit 2 in OP2 66 and forces signal ALUCN4− to logical ONE, indicating that the subtraction resulted in a negative number. Flop 76-50 is reset and signal ALUCIN− is forced to logical ONE.

During step 9, ALQR 72 is incremented and the partial remainder decimal digit 7 is compared with the divisor decimal digit 5. Signal FRCICK+ forces signal ALUCIN− to logical ZERO.

During step 10, MIER 52 is decremented and stores decimal digit 0. Flop 76-50 is set and signal ALUCIN− is forced to logical ZERO. The result of the comparison is positive and signal ALUCN4− is at logical ZERO.

During step 11, partial remainder decimal digit 2 replaces decimal digit 7 in OP2 66.

During step 12, ALQR 72 is incremented to store quotient decimal digit 3. Since signal MIEREO+ indicates to control store addressing logic 58, FIG. 4, that the content of MIER 52 is decimal ZERO, test signal FRCICK+ is forced to logical ONE, forcing signal ALUCIN− to logical ZERO. Divisor decimal digit 5 is subtracted from partial remainder digit 2. Signal ALUCN4− at logical ONE indicates that the result of the subtraction is a negative number. Signal MIEREO+ at logical ONE and signal ALUCN4− at logical ZERO indicate to control store addressing logic 58 that the divide calculations are completed.

During step 13, the content of ALQR 72, quotient decimal digit 3, is stored in RFD 50-1. RFD 50-1 stores the quotient decimal 13 and OP2 66 stores the remainder of decimal 2.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system including a main memory for storing instructions including decimal divide instructions, and also storing a plurality of operands including a divisor and a dividend, a commercial instruction processor including apparatus for executing said decimal divide instructions comprising:

control means responsive to said decimal divide instructions for generating a plurality of control signals and a plurality of decode signals;

first means for storing said divisor;

second means for storing said dividend, a sequence of partial remainders and a remainder, each of said sequence of partial remainders replacing said dividend and previous ones of said sequence of partial remainders, said remainder replacing a last of said sequence of partial remainders;

third means coupled to said first and said second means for subtracting said divisor from said dividend and said sequence of partial remainders for generating said remainder;

fourth means coupled to said third means for counting the number of subtractions resulting in a positive partial remainder for generating a quotient;

fifth means coupled to said second means for storing a most significant decimal digit of each of said sequence of partial remainders and generating a ZERO signal indicative of the contents of said fifth means being a decimal ZERO, said control means being responsive to said ZERO signal for generating a first decode signal, wherein said third means includes multiplexer means coupled to said conrol means and responsive to said first decode signal for generating a test signal for determining if a most significant decimal digit of each of said sequence of partial remainders is less than a most significant decimal digit of said divisor for avoiding a subtraction and an add back sequence.

2. The apparatus of claim 1 wherein said multiplexer means comprises:

a multiplexer responsive to said first decode signal for generating a carry-in signal;

an arithmetic logic unit responsive to said carry-in signal for subtracting said most significant decimal digit of said divisor from said most significant decimal digit of said each of said sequence of partial products for generating a carry-out signal if the result of the subtraction is negative.

3. The apparatus of claim 2 wherein said control means is responsive to said carry-out signal for generating said plurality of control signals;

said fourth means being responsive to said plurality of control signals for transferring a digit of said quotient to a scratchpad memory, said first means being responsive to said plurality of control signals for shifting said divisor one decimal digit position to the right, and a next sequence of subtraction is started to generated a next decimal digit of said quotient.

* * * * *